(12) United States Patent
Sadhu et al.

(10) Patent No.: US 10,935,641 B2
(45) Date of Patent: Mar. 2, 2021

(54) PHASE NOISE SHAPING IN A DISTANCE MEASUREMENT SYSTEM

(71) Applicant: TEXAS INSTRUMENTS INCORPORATED, Dallas, TX (US)

(72) Inventors: Subhash Chandra Venkata Sadhu, Bengaluru (IN); Bharath Patil, Bengaluru (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 484 days.

(21) Appl. No.: 15/796,930

(22) Filed: Oct. 30, 2017

(65) Prior Publication Data

US 2019/0129017 A1   May 2, 2019

(51) Int. Cl.
*G01S 7/4915* (2020.01)
*G01S 17/36* (2006.01)
*G01S 17/89* (2020.01)

(52) U.S. Cl.
CPC .......... *G01S 7/4915* (2013.01); *G01S 17/36* (2013.01); *G01S 17/89* (2013.01)

(58) Field of Classification Search
CPC ........ G01S 7/4915; G01S 17/36; G01S 17/89; G01S 17/894
See application file for complete search history.

(56) References Cited

U.S. PATENT DOCUMENTS

| 9,542,749 | B2* | 1/2017 | Freedman | G06T 7/536 |
| 2016/0011298 | A1* | 1/2016 | Reimann | G01S 3/143 |
| | | | | 342/458 |
| 2016/0019684 | A1* | 1/2016 | Hudman | G01S 17/89 |
| | | | | 348/86 |
| 2016/0343169 | A1* | 11/2016 | Mullins | G02B 27/017 |
| 2018/0106891 | A1* | 4/2018 | Thurner | G01S 7/497 |

OTHER PUBLICATIONS

Godbaz, J.P., Cree, M.J., & Dorrington, A. A. (2012). "Understanding and Ameliorating Non-Linear Phase and Amplitude Responses in AMCW Lidar." Remote Sensing, 4(1), 21-42.

* cited by examiner

*Primary Examiner* — Isam A Alsomiri
*Assistant Examiner* — Amir J Askarian
(74) *Attorney, Agent, or Firm* — John R. Pessetto; Charles A. Brill; Frank D. Cimino

(57) ABSTRACT

A distance measurement system includes a light transmitter to generate a modulated light signal, a light sensor to generate measurement signals from reflected light among four quad phase angles with respect to a phase of the generated light signal, and a controller. The controller selects a first set of quad phase angles, and generates first measurement signals at the quad phase angles of the first set. Based on the first measurement signals, the controller computes a first phase angle between the generated light signal and the reflected light signal, generates a second set of quad phase angles based on the first phase angle, and generates second measurement signals at the quad phase angles of the second set. Further, based on the second measurement signals, the controller computes a second phase angle between the generated light signal and the reflected light signal and calculates a distance using the second phase angle.

9 Claims, 5 Drawing Sheets

PHASE NOISE SHAPING IN A DISTANCE MEASUREMENT SYSTEM

BACKGROUND

Three-dimensional (3D) time-of-flight (ToF) camera systems work by transmitting light with periodically varying intensity and measuring the phase of the reflected light detected by photo sensors. The amount of phase delay between the transmitted and reflected light signals is proportional to the distance between the camera system and the 3-D object. Therefore, distance is calculated form the measured phase delay. Various sources of noise are present in the measurements made by a 3D ToF camera system. Examples of source of noise include photon shot noise, pixel thermal noise (kTC), noise in the analog-to-digital converter (ADC) which produces a digital value from the measurements, and ADC quantization noise. Noise in the measurements causes inaccuracies in the computed distances.

SUMMARY

In accordance with at least one embodiment of the invention, a distance measurement system includes a light transmitter to generate a modulated light signal, a light sensor to generate measurement signals from reflected light among multiple (e.g., four) quad phase angles with respect to a phase of the generated light signal, and a controller. The controller selects a first set of quad phase angles, and generates first measurement signals at the quad phase angles of the first set. Based on the first measurement signals, the controller computes a first phase angle between the generated light signal and the reflected light signal, generates a second set of quad phase angles based on the first phase angle, and generates second measurement signals at the quad phase angles of the second set. Further, based on the second measurement signals, the controller computes a second phase angle between the generated light signal and the reflected light signal and calculates a distance using the second phase angle.

In another embodiment, a system includes a light transmitter configured to generate a modulated light signal and a light sensor configured to receive a reflected light signal and to generate measurement signals among four quad phase angles with respect to a phase of the generated light signal. The system also includes a controller coupled to the light sensor. The controller is configured to dynamically vary the quad phase angles and to calculate distance using the dynamically varying quad phase angles.

In yet another embodiment, a method includes generating a modulated light signal and selecting a first set of quad phase angles. Based a reflected light signal, the method includes generating first measurement signals at the quad phase angles of the first set. Further, based on the first measurement signals, the method includes computing a first phase angle between the generated light signal and the reflected light signal. In addition, the method includes generating a second set of quad phase angles based on the first phase angle, generating second measurement signals at the quad phase angles of the second set, and based on the second measurement signals, computing a second phase angle between the generated light signal and the reflected light signal. A distance using the second phase angle is then calculated.

BRIEF DESCRIPTION OF THE DRAWINGS

For a detailed description of various examples, reference will now be made to the accompanying drawings in which.

DETAILED DESCRIPTION

Figure 1:
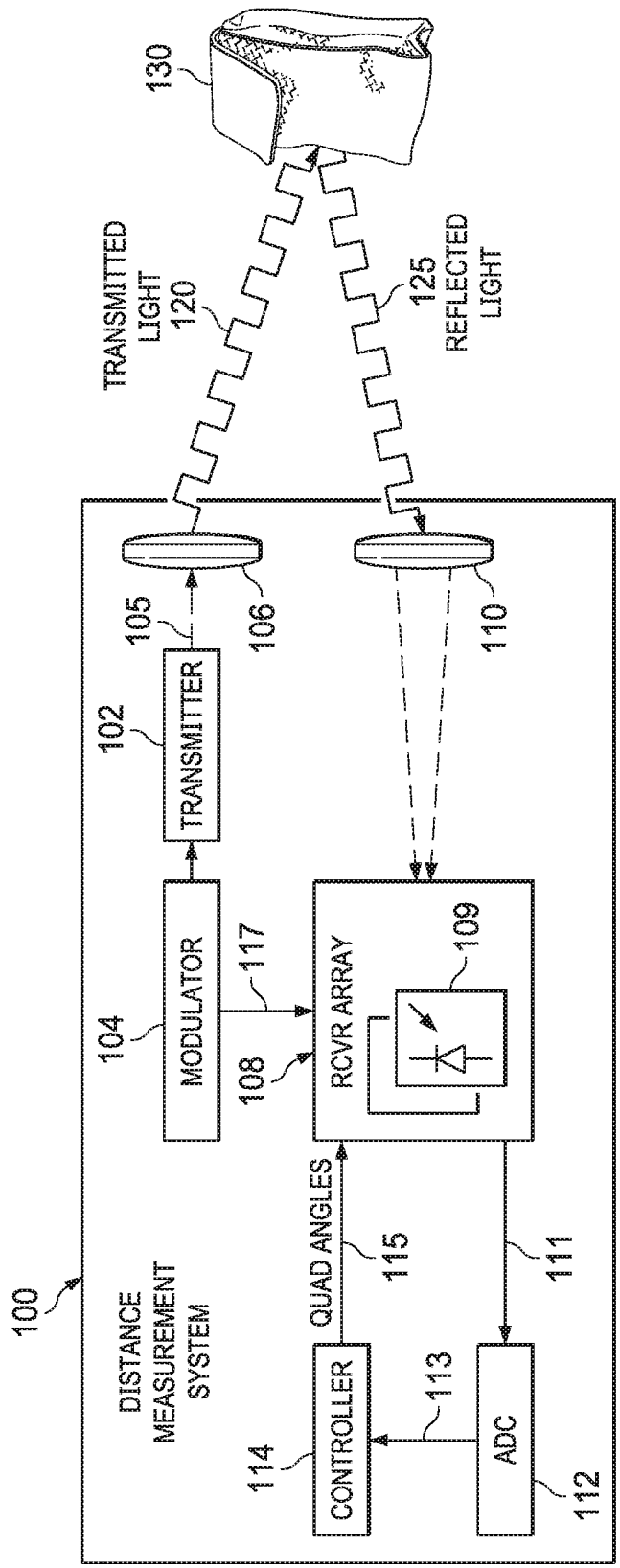
FIG. 1 illustrates a distance measurement system in accordance with various examples.

In accordance with the disclosed embodiments, a distance measurement system (e.g., a 3D ToF camera) transmits a modulated light signal, and calculates the phase angle between the transmitted modulated light signal and the reflected light signal received at a receiver of the system. The calculation of the phase angle uses a set of time windows that are phase delayed relative to the phase of the transmitted modulated light signal. In the illustrative example herein, there are four time windows (referred to as "quads") and each time window has a different phase delay relative to the transmitted modulated light signal. One illustrative set of quad phase angles includes 0 degrees, 90 degrees, 180 degrees, and 270 degrees.

During each of this phase delayed time windows, the distance measurement system takes a measurement indicative of the amount of reflected light received by the system during the respective time window. In one example, the reflected light signal impinges on a photo detector which then generates an electrical current. The generated electrical current then may be multiplied by a reference electrical signal (which may have the same frequency as the light signal) and the multiplied resulting signal is then used to charge a capacitor. The capacitor's voltage is related to the amount of reflected light received during the time window. Other techniques are possible as well for making the measurement such as digitizing the current and then integrating the current in the digital domain. The time windows may be implemented by, for example, transistor switches that cause the photo detector to be coupled to or decoupled from the circuit that makes the measurement. The timing (start and stop times) of time windows are controlled by a controller within the distance measurement device.

As mentioned above, various sources of noise such as photon shot noise, pixel thermal noise, noise in the analog-to-digital converter (ADC) which produces a digital value from the measurements, and ADC quantization noise can infect the measurements. In accordance with the disclosed embodiments, the distance measurement system dynamically adjusts the quad phase angles to reduce the detrimental effects of such noise. Thus, during operation, the distance measurement system may change the quad phase angles from a first set of quad phase angles (e.g., 0 degrees, 90 degrees, 180 degrees, and 270 degrees) to a second set of quad phase angles that may include, for example, 0 degrees, 180 degrees, and two other angles different than 90 degrees and 270 degrees. The calculation of the new quad phase angles is based on a determination of the phase angle between the transmitted and reflected light signals, and example of the calculation is provided below. Once the new set of quad phase angles is determined, the new set of quad phase angles are used to compute a second phase angle between the transmitted and reflected light signals. The resulting new set of quad phase angles is such that the effects of noise on the second phase angle are less than would have been the case if the former set of quad angles were used.

FIG. 1 shows an example of a distance measurement system 100 usable to measure distance between the distance measurement system 100 and a 3D object 130. In one example, the distance measurement system 100 is a 3D ToF camera. The distance measurement system 100 in this example includes a light transmitter 102, a modulator 104, optic lenses 106 and 110, a receiver array 108, an analog-to-digital converter (ADC) 112, and a controller 114. Alternative or additional components may be included as well. The transmitter 102 may include a solid-state laser or a light emitting diode (LED) operating at, for example, a near-infrared wavelength such as 850 nm, although different wavelengths are possible as well. The modulator 104 generates a modulation signal which is used by the transmitter to generate a modulated light signal to be transmitted through lens 106. The modulation frequency of the transmitted light 120 sets the maximum distance that can be measured by the distance measurement system. As such, different modulation frequency can be selected for different distance applications.

Transmitted light 120 reflects off a surface of the 3D object 130 and reflected light 125 is received through lens 110 into the receiver array 108. The receiver array 108 may comprise multiple photo detectors 109. Each photo detector 109 generates a current based on the light received by the photo detector as well as a reference electrical signal 117 from the modulator 104 (as explained above), and the current can be used to make a measurement as noted above. For example, the current can be used to charge a capacitor whose resulting voltage is the measurement value used to compute distance. The various photo detectors 109 comprising the receiver array 108 may be used to compute distances to various points on the surface of the 3D object 130 thereby creating, for example, a 3D contour map of the object.

The receiver array 108 is coupled to the ADC 112. Measurement signals 111 from the receiver array 108 are digitized by the ADC 112 and digital values 113 are provided to the controller 114 for further processing. The controller 114 may perform one or more of the operations described herein upon execution of machine instructions (e.g., firmware). In other embodiments, the controller 114 may comprise a programmable logic device, a discrete circuit or other type of circuit or device that can perform the operations described herein.

The controller 114 exposes the receiver array in distinct time windows (quads). Each quad has a different phase angle and the phase angle is the phase difference between the transmitted light signal and the reference electrical signal. The controller 114 computes the quad phase angles 115 and provides them to the receiver array 108 for implementation. The quad phase angles may be implemented, for example, as a start timing signal relative to an edge of the transmitted light signal 120. The length of a given time window may be specified by the controller 114 as well as a time value relative to the start timing signal.

Figure 2:
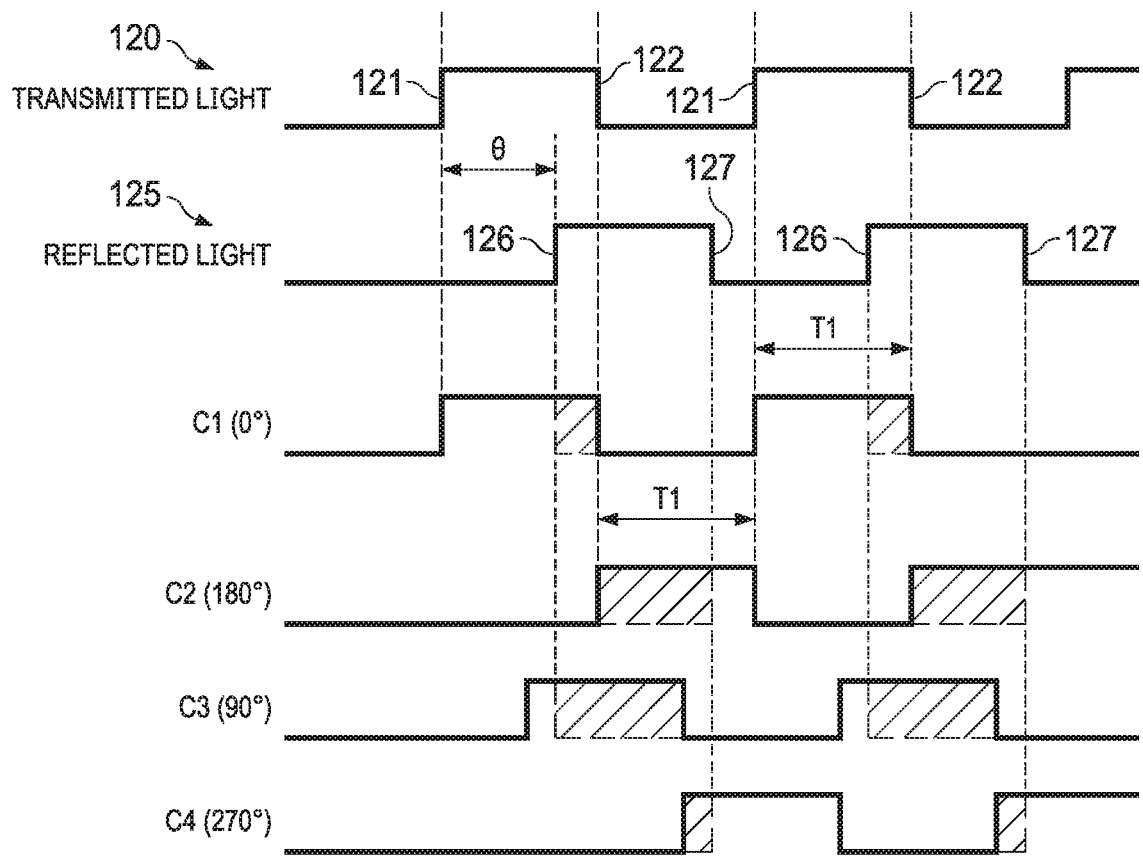
FIG. 2 shows a set of waveforms illustrating operation of the distance measurement system in accordance with various examples.

FIG. 2 shows an example set of waveforms. The transmitted light signal 120 is a modulated signal illustrated as a generally square wave with rising edges 121 and corresponding falling edges 122. The reflected light signal 125 is modulated the same as the transmitted light signal 120 but is phase delayed by an angle $\theta$ from the transmitted light signal 120. The edges 126 (and 127) of the reflected signal 125 correspond to edges 121 (and 122) of the transmitted light signal 120 but delayed due to the distance over which the light travels. The amount of the phase delay $\theta$ is a function of the distance between the distance measurement system 100 and the point on the surface of the 3D object 130 which reflects the transmitted light signal 120.

FIG. 2 also illustrates a set of time windows C1, C2, C3, and C4 corresponding to a set quad phase angles 0 degrees, 90 degrees, 180 degrees, and 270 degrees. Time window C1 (0 degrees) is aligned to the phase of the transmitted light signal 120 whereas time window C2 (180 degrees) is 180 degrees out of phase with respect to the transmitted light signal as shown. Time windows C3 and C4 represent 90 degree and 270 degree phase shifts from the transmitted light signal 120. The cross-hatching shown for the various time windows represents the time period during each such time window that the reflected light signal is impinging on the photo detector. The time periods in which the reflected light signal impinges on the photo detector during the various time windows is a function of the corresponding quad phase angle. The measurement signals recorded by the receiver array for the quad phase angles thus may vary from time window to time window and are used by the controller 114 to calculate the phase angle $\theta$ between the transmitted and reflected light signals 120 and 125.

Equation (1) below represents an example of the relationship between the various quad phase angles and the measurements from the receiver array 108.

$$\begin{bmatrix} \cos(0) & \sin(0) \\ \cos(\pi/2) & \sin(\pi/2) \\ \cos(\pi) & \sin(\pi) \\ \cos(3\pi/2) & \sin(3\pi/2) \end{bmatrix} \begin{bmatrix} I \\ Q \end{bmatrix} = \begin{bmatrix} S1 \\ S2 \\ S3 \\ S4 \end{bmatrix} \quad (1)$$

where S1-S4 represent the measurements (e.g., voltage measurements) during the four time windows corresponding to the four quad phase angles. Equation (1) is valid in the example in which transmitted and reflected modulated light signals are sinusoids and the photo detector current is a multiplication of the received light signal with the electrical reference signal. The arguments of the cosine and sine values represent the four quad phase angles in radians. Thus, quad phase angles 0 rad, $\pi/2$ rad, $\pi$ rad, and $3\pi/2$ rad corresponding to the angles 0 degrees, 90 degrees, 180 degrees and 270 degrees, respectively. Equation (1) can be solved by the controller 114 for I and Q, which can then be used to calculate the phase angle $\theta$ between the transmitted and reflected light signals 120 and 125:

$$\theta = \arctan\left(\frac{Q}{I}\right) \quad (2)$$

The distance between the distance measurement system 100 and the 3D object then can be calculated as:

$$d = \theta\left(\frac{c}{4\pi f}\right) \quad (3)$$

where c is the speed of light and f is the modulation frequency.

Figure 3:
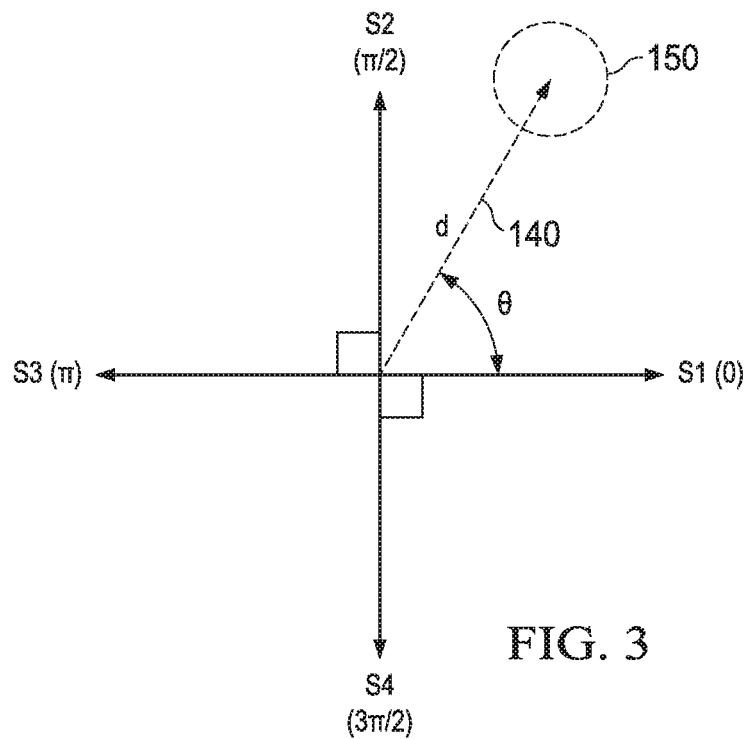
FIG. 3 illustrates the relationship between a computed phase angle between transmitted and reflected light signals and the measurements using a set of quad phase angles in accordance with one example.

FIG. 3 illustrates vectors corresponding to each of the four measurement values S1-S4. An illustrative calculated phase angle θ also is shown. The magnitude of the vector 140 defining the phase angle θ is the calculated distance d. The dashed region 150 represents the uncertainty in the calculation of the phase angle θ and thus the distance d. In this example, the noise region 150 is approximately circular and the actual distance d may vary from that shown bounded by the noise region 150.

Figure 4:
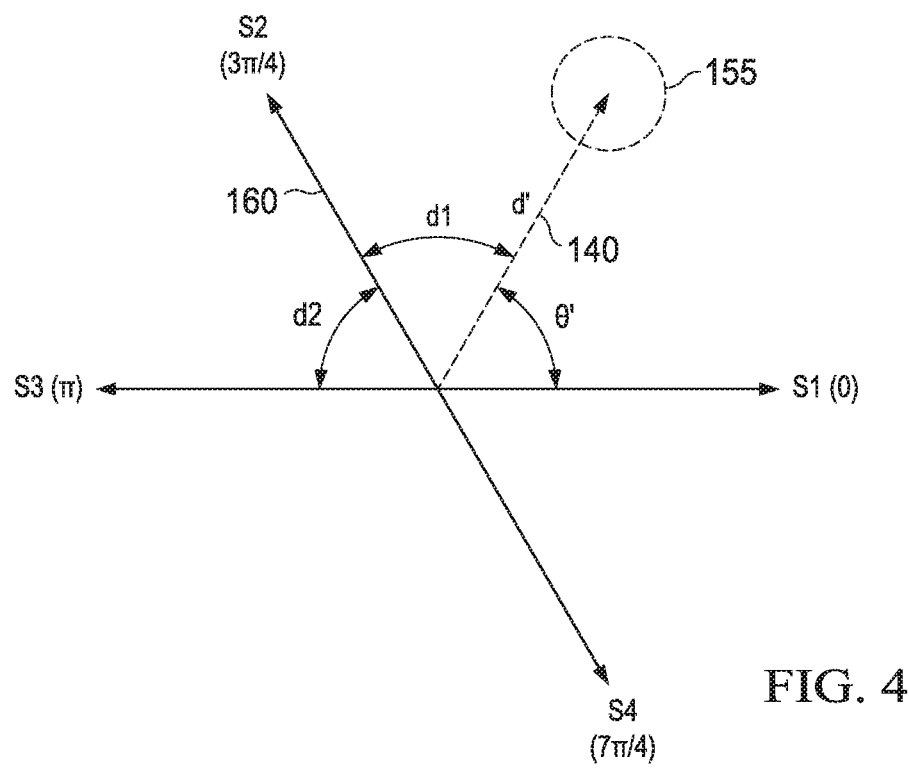
FIG. 4 shows another example of the relationship between a computed phase angle between transmitted and reflected light signals and the measurements using a different set of quad phase angles.

In accordance with illustrative embodiments, the controller 114 may modify the quad phase angles to be used to make the various measurements S1-S4 to thereby change the shape of the noise region. The shape can be changed to compress it in the direction of the distance vector. FIG. 4, for example, illustrates an example in which the set of quad phase angles include 0 rad, 3π/4 rad, π rad, and 7π/4 rad. The 0 rad and π rad quad phase angles are retained but the π/2 rad and 3π/2 quad phase angles have been changed to 3π/4 rad and 7π/4 rad. The 3π/4 rad (S2) and 7π/4 rad (S4) quad phase angles have been calculated by the controller 114 to define an axis 160 such that the vector 140 defined by angle θ bisects the angle defined by S1 and S2, and thus θ equals α1 in FIG. 4. With the quad phase angles recalculated in this manner for phase angle θ, a new phase angle θ' is calculated. The shape of the noise region 155 for the new phase angle θ' is compressed for the range of possible phase angle calculations as shown thereby reducing the uncertainty range of the phase angle. With a tighter possible range of possible phase angles, the calculated distance d' advantageously has a narrower range as well.

In another example, the new set of quad phase angles can all be different than the former set of quad phase angles. In one such example, the new set of quad phase angles are calculated by the controller 114 such that the vector defined by phase angle θ is perpendicular to the average of the set of quad phase angles. That is, $$\theta = \frac{1}{n} * \sum_{i=1}^{n} \alpha_i \pm \pi/2 \quad (4)$$

where n represents the number of quads (4 in the disclosed examples). In some embodiments, the controller 114 determines the quads to satisfy equation (4) and to minimize $$\frac{1}{n} * \sum_{i=1}^{n} \alpha_i \pm \frac{\pi}{2} - \theta.$$

The generalized form of equation (1) is given as follows:

$$\begin{bmatrix} \cos(\varphi 1) & \sin(\varphi 1) \\ \cos(\varphi 2) & \sin(\varphi 2) \\ \cos(\varphi 3) & \sin(\varphi 3) \\ \cos(\varphi 4) & \sin(\varphi 4) \end{bmatrix} \begin{bmatrix} I \\ Q \end{bmatrix} = \begin{bmatrix} S1 \\ S2 \\ S3 \\ S4 \end{bmatrix} \quad (5)$$

where φ1 through φ4 represent the four quad phase angles.

Figure 5:
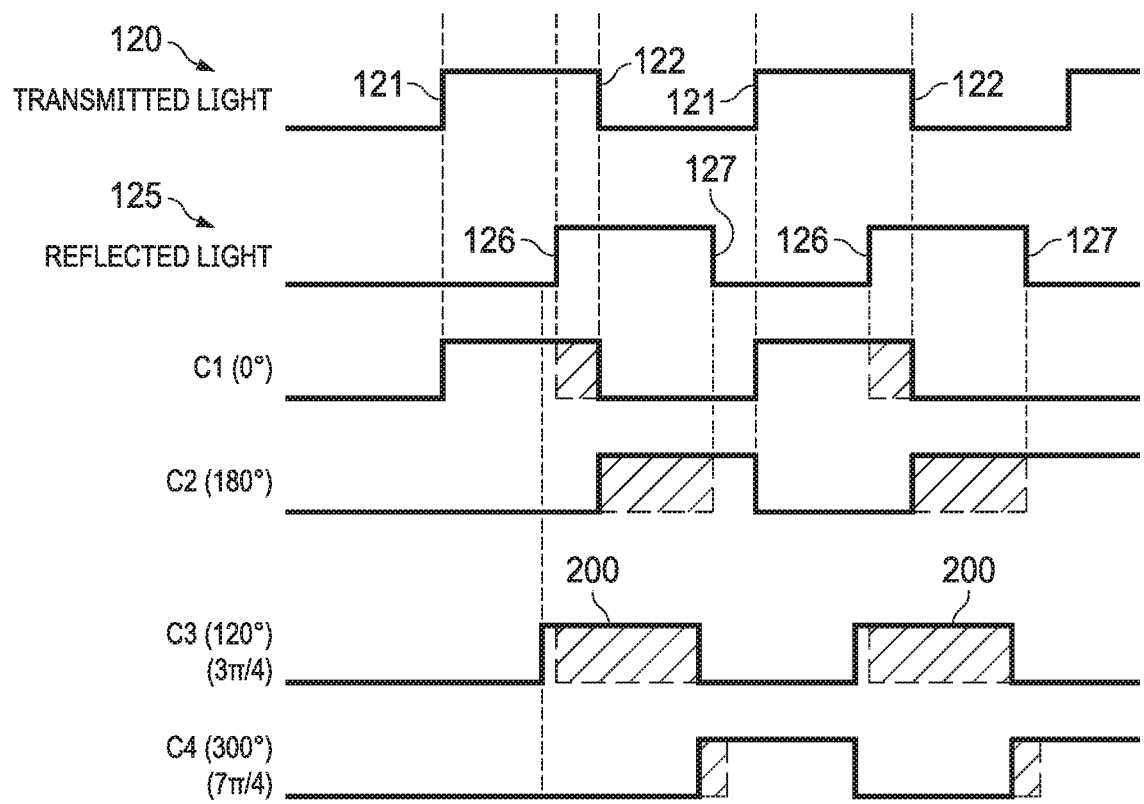
FIG. 5 shows another set of waveforms illustrating operation of the distance measurement system in accordance with various examples.

FIG. 5 shows the waveforms of FIG. 2 but with the time windows C3 and C4 recalculated to have different quad phase angles (120 degrees which is 3π/4, and 300 degrees which is 7π/4). As a result, the amount (time exposure) of reflected light received by the receiver array during the C3 time window is increased relative to that of FIG. 2.

Figure 6:
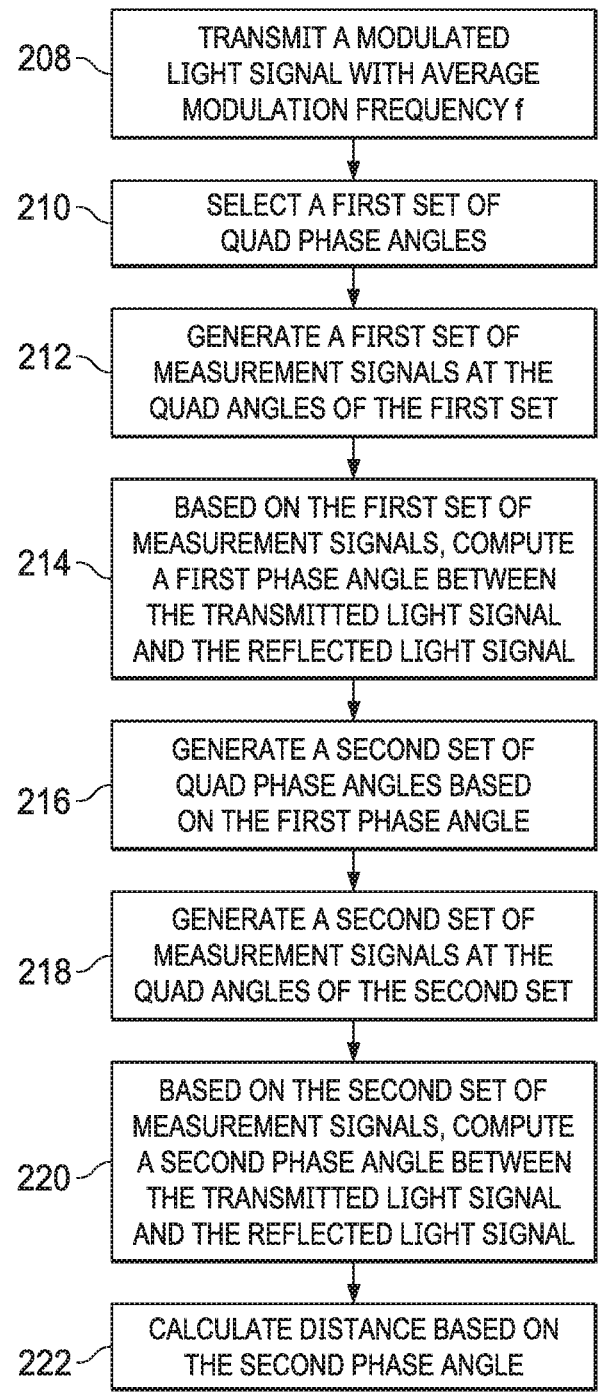
FIG. 6 includes a flowchart illustrating a method in accordance with an example.

FIG. 6 illustrates a method in accordance with various embodiments. The operations may be performed in the order shown, or in a different order. Further, the operations may be performed sequentially, or the two or more of the operations may be performed concurrently. The operations may be performed by, or under the control of, the controller 114 of FIG. 1.

At 208, the method includes transmitting a modulated light signal with, for example, an average modulation frequency f. The modulated light signal may be continuously transmitted as soon as the distance measurement system 100 is turned on, or may be transmitted upon a user activating a control (e.g., a button) on the system. The transmitted light signal may be in the near-infrared part of the electromagnetic spectrum, although other wavelengths may be implemented as well for the transmitter.

At 210, the method includes selecting a first set of quad phase angles. In one example, the first set of quad phase angles includes 0 degrees, 180 degrees, 90 degrees and 270 degrees, although a different set of quad phase angles may be selected. At 212, the method includes generating a first set of measurement signals at the quad angles of the first set. For example, the voltage on a capacitor may be monitored during each of the time windows corresponding to each of the quad phase angles of the first set.

At 214, based on the first set of measurement signals, the method includes computing a first phase angle between the transmitted light signal and the reflected light signal. In one embodiment, this computation may comprise solving equation (5) above for I and Q and then computing the phase angle using equation (2). The phase angle calculated in operation 214 is an estimate of the phase angle between the transmitted and reflected light signals.

At 216, the illustrative method includes generating a second set of quad phase angles based on the phase angle calculated in 214. An example of this operation is to retain the quad phase angles 0 and 180 degrees (0 and π rad) and compute an additional two quad phase angles as explained above. If the phase angle computed at 214 is less than the second lowest quad phase angle (e.g., less than 90 degrees if 0, 90, 180, and 270 degree quad phase angles are used), then one quad phase angle defines an axis that bisects 0 and the second lowest quad phase angle. However, if the phase angle computed at 214 is greater than the second lowest quad phase angle (e.g., greater than 90 degrees if 0, 90, 180, and 270 degree quad phase angles are used), then one quad phase angle defines an axis that bisects axis defined by the second lowest quad phase angle and 180 degrees. In either, case, a fourth quad phase angle is computed to be supplementary the newly calculated quad phase angle. Another example is provided above in which a second set of quad phase angles is computed so that the phase angle θ is perpendicular to the average of the set of quad phase angles (see eq. (4) above).

At 218, the method includes generating second measurement signals at the quad phase angles of the second set. This operation is similar to that of operation 212 but with a set of quad phase angles that is different than that used in operation 212. At 214, based on the second set of measurement signals, the method includes computing a second phase angle between the transmitted light signal and the reflected light signal. As explained above, this computation may comprise solving equation (4) above for I and Q and then computing the phase angle using equation (2). At 222, the method includes calculating a distance using the second phase angle.

As explained above, distance can be calculated from a calculation of the phase angle θ between the transmitted and reflected light signals. The size of the phase angle θ is a function of the time it takes for the light to travel to, and reflect off of, the 3D object and be received by the receiver array 108. Thus, the phase angle θ will be different for light that is reflected off different surface points of the 3D object. Surface points that are farther from the distance measurement system 100 will have larger phase delays than for surface points that are closer. In general, the signal-to-noise ratio (SNR) is smaller for more distant points than for closer points. Accordingly, in some embodiments, the controller 114 may dynamically compute quad phase angles using the largest phase angle θ computed from the receiver array 108. That is, the controller calculates the phase angles θ for each of the photo detectors 109 in the receiver array and thus to various points on a 3D object or scene. The largest calculated phase angle corresponds to the most distant point and the quad phase angles are dynamically determined for the subsequent assessment of distances using that particular phase angle.

One application of the distance measurement system 100 is to compute a 3D distance map to a time varying scene (e.g., a live scene for which distances to the various surfaces in the scene vary with respect to the distance measurement system). The distance measurement system 100 may calculate a set of distances for each of the photo detectors 109 of the receiver array 108 at various time intervals (e.g., periodic time intervals) such as 30 times per second (30 "frames" per second). The quad phase angles thus can be adjusted between successive frames. For a given frame, the phase angles are computed for the various photo detectors and for the next frame, the quad phase angles are adjusted based on the largest phase angle computed from the previous frame.

Figure 7:
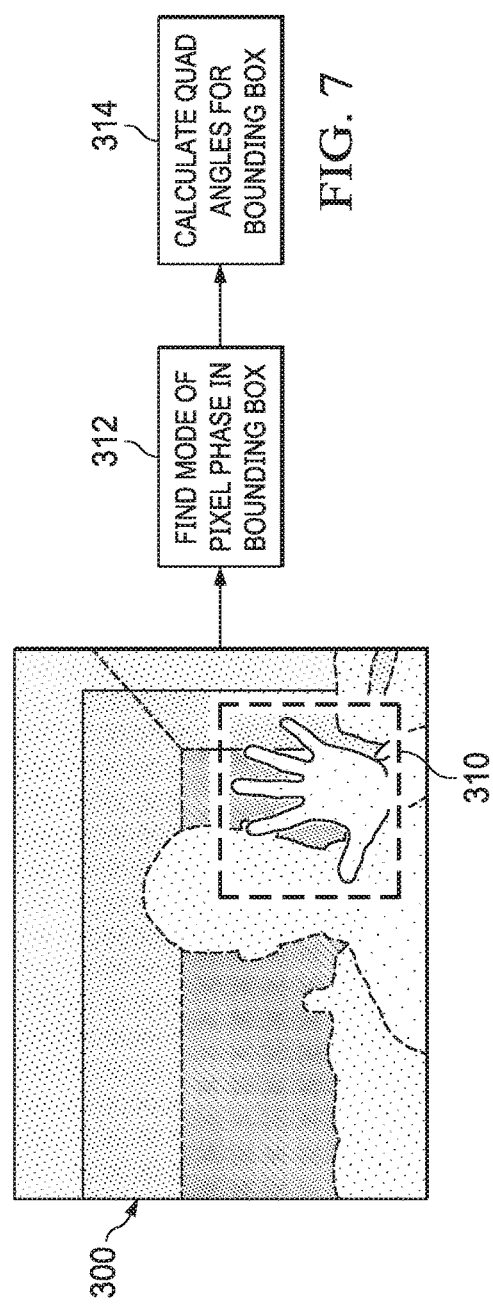
FIG. 7 shows an example of a use of the distance measurement system.

FIG. 7 illustrates another use of the distance measurement system 100 and how the quad phase angles can be dynamically changed. In this example, a 3D scene 300 includes a person holding up his hand. As such, the person's hand is closer to the distance measurement system 100 than the person's head and the rest of the background. In some embodiments, a portion of a scene may be of greater interest for distance tracking than other portions of the scene. In the example of FIG. 7, the person's hand is of greater interest. In such embodiments, the controller 114 may compute the quad angles based on the calculated phase angle θ to the scene portion of interest. A bounding box 310 is shown encompassing the person's hand (and the portion of interest in general). The system 100 could decide the portion of interest differently depending on the application for which it is being used. For obstacle avoidance, it would look at a rectangle of a fixed size with pixels which show the smallest (nearest) phase value. If it is a gesture recognition system, it would look for specific patterns like a hand, arm, etc. Such determinations of the portion of interest may be performed by a processor separate from the controller 114 of the distance measurement system 100.

The distance measurement system 100 calculates the phase angles θ for different points within the bounding box 310, and then assigns each computed phase angle to one of multiple bins. Each bin defines a relatively small range of phase angles (or a single phase angle). By assigning each calculated phase angle to its corresponding bin, a count of the number of phase angles within each bin can be determined. The controller 114 determines (312) the "mode" of the bounding box to be the phase angle θ of the bin with the largest number of phase angles. If the bin is mapped to a range of phase angles, the mode of the bin may be computed as the average phase angle or may be selected to be one of the phase angles in the range. At 314, the controller calculates the quad phase angles based on the determined mode's phase angle θ.

Distance is calculated as explained herein based on phase angle, which wraps around every 2π radians, resulting in an aliasing distance. The distance at which aliasing occurs is referred to as the ambiguity distance, damb, and is inversely related to the modulation frequency, f, as:

$$damb = \frac{c}{2f} \quad (6)$$

The ambiguity distance, damb, is the maximum measurable distance for a given frequency. To increase the measurable distance, the frequency f can be lowered but at the cost of reduced accuracy.

In accordance with the disclosed embodiments, multiple (e.g., 2) different frequencies are used concurrently. The light transmitter 102 in FIG. 1 can transmit multiple light signals with different modulation frequencies. Measuring the same object with two (or more) different frequencies produces two different phase angles between the transmitted and reflected light signals. The combination of two phase angles is unambiguous for a distance that is longer than for either of the frequencies individually. For example, the unambiguous distance for each of the frequencies 60 MHz and 80 MHz is 2.498 m and 1.875 m, respectively. However, concurrently using both 60 MHz and 80 MHz together results in an unambiguous distance of 7.5 m. In such embodiments, the system 100 performs measurements with both frequencies concurrently.

For the individual frequency measurements to be discernible, the cos/sin matrix of equation (5) should be invertible. The modified version of equation (5) to accommodate two different frequencies may be:

$$\begin{bmatrix} \cos(\varphi 1) & \sin(\varphi 1) & \cos(\theta 1) & \sin(\theta 1) \\ \cos(\varphi 2) & \sin(\varphi 2) & \cos(\theta 2) & \sin(\theta 2) \\ \cos(\varphi 3) & \sin(\varphi 3) & \cos(\theta 3) & \sin(\theta 3) \\ \cos(\varphi 4) & \sin(\varphi 4) & \cos(\theta 4) & \sin(\theta 4) \end{bmatrix} \begin{bmatrix} I1 \\ Q1 \\ I2 \\ Q2 \end{bmatrix} = \begin{bmatrix} S1 \\ S2 \\ S3 \\ S4 \end{bmatrix} \quad (7)$$

I1 and Q1 are the I,Q components of the first frequency's vector. I2 and Q2 are the I,Q components of the second frequency's vector. φn (n is 1, 2, 3, 4) are the quad phase angles of the first frequency, and θn are the quad phase angles for the second frequency. Each frequency's quad phase angles can be optimized to obtain the noise shaping advantage as is described above. Although two different frequencies are noted above, the technique can be extended to any number of frequencies.

Figure 8:
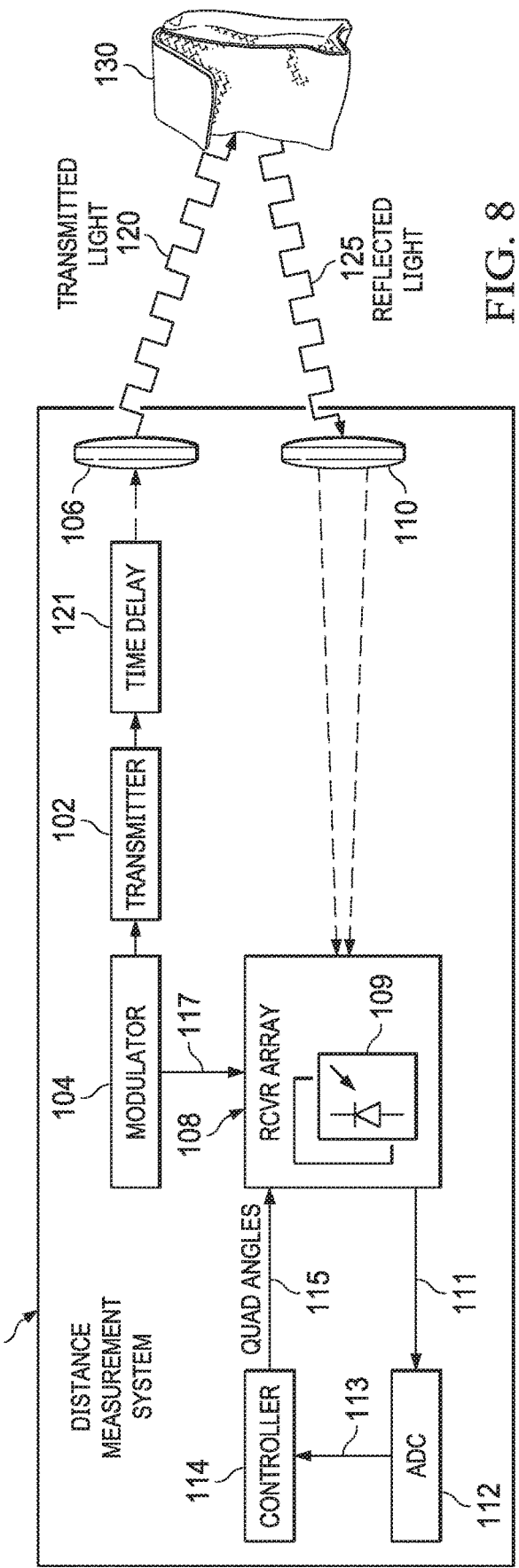
FIG. 8 shows an example including a time delay in the transmit signal path.

FIG. 8 illustrates an embodiment similar to that of FIG. 1, but one that includes a controllable time delay 121 in the transmitted light signal path). The time delay 121 may be a a hardware time delay circuit or a software-controlled time delay. The amount of the time delay implemented by the time delay 121 can provide additional control over the time amount of time delay between the transmitted light signal and the quad time windows.

In the waveform examples of FIGS. 2 and 5, the length of each time window C1-C4 (designated in FIG. 2 as T1) represents a portion of the integration time for the measurements S1-S4. In the examples of FIGS. 2 and 5, the integration times for the various quad phase angles may be longer than T1 (e.g., a few orders of magnitude longer than T1) and may be the same. However, in other embodiments the integration time (or T1) of one quad phase angle may be different than the integration time (T1) of another quad phase angle. The integration times of the various quad phase angles is controlled by controller 114 and can be varied to further shape the noise region of each calculated phase angle θ. The direction in which there is more integration time will have a larger SNR, and the direction with less integration time will have a smaller SNR. One illustrative strategy can be for the controller 114 to assign more integration time to directions perpendicular to the expected vector defined by the angle θ and distance d. This is an alternative to varying the amount of noise in a given direction. This latter technique may not rotate the noise envelope, but it can change the shape of the noise envelope. So when the quad angles cannot be set to values accurate enough (e.g., due to hardware limitations), the controller 114 instead can control the integration time for quads in each direction.

Certain terms are used throughout the following description and claims to refer to particular system components. Different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A distance measurement system, comprising:
a light transmitter configured to generate a modulated light signal;
a light sensor configured to receive a reflected light signal and to generate measurement signals among four quad phase angles with respect to a phase of the generated light signal; and
a controller coupled to the light sensor and configured to:
select a first set of quad phase angles;
generate first measurement signals at the quad phase angles of the first set;
based on the first measurement signals, compute a first phase angle between the generated light signal and the reflected light signal;
generate a second set of quad phase angles based on the first phase angle;
generate second measurement signals at the quad phase angles of the second set;
based on the second measurement signals, compute a second phase angle between the generated light signal and the reflected light signal; and
calculate a distance using the second phase angle;
wherein:
the first set of quad phase angles comprises 0 degrees, 90 degrees, 180 degrees and 270 degrees;
the second set of quad phase angles includes 0 degrees and 180 degrees;
the controller is configured to compute a third quad phase angle such that the first phase angle defines a vector that bisects the third quad phase angle; and
the controller is configured to compute a fourth quad phase angle that is supplementary to the third quad phase angle.

2. The distance measurement system of claim 1, wherein the controller is further configured to:
generate the first measurement signals at the quad phase angles of the first set for each of multiple points of a three-dimensional scene;
based on the first measurement signals for each of the multiple points, compute a first phase angle between the generated light signal and the reflected light signal for each of the multiple points;
compute a distance to each of the multiple points based on the first phase angles for the multiple points; and
for a particular point of the multiple points whose computed distance is longer than the distances computed for other of the points, generate the second set of quad phase angles based on the first phase angle computed for that particular point.

3. The distance measurement system of claim 2, wherein the controller is further configured to calculate, for each point, the second phase angle between the generated light signal and the reflected light signal, and to calculate a distance to each of the multiple points using the corresponding second phase angles.

4. The distance measurement system of claim 1, wherein the controller is configured to define an integration time for each quad phase angle for generation of the measurement signals, and wherein the integration time for at least one quad phase angle is different than the integration time for at least one other quad phase angle.

5. The distance measurement system of claim 1, wherein the light transmitter is configured to generate multiple light signals at different modulation frequencies, and wherein the controller is configured to calculate the distance using the multiple light signals.

6. The distance measurement system of claim 5, wherein the controller is configured to compute separate first phase angle between the generated light signal and the reflected light signals for each of the multiple frequencies.

7. A method, comprising:
generating a first modulated light signal;
selecting a first set of quad phase angles;
based a reflected light signal, generating first measurement signals at the quad phase angles of the first set;
based on the first measurement signals, computing a first phase angle between the generated light signal and the reflected light signal;
generating a second set of quad phase angles based on the first phase angle;
generating second measurement signals at the quad phase angles of the second set;
based on the second measurement signals, computing a second phase angle between the generated first modulated light signal and the reflected light signal; and
calculating a distance using the second phase angle;

wherein:
generating the second set of quad phase angles includes computing a quad phase angle such that the first phase angle defines a vector that bisects the third quad phase angle.

8. The method of claim 7, further comprising defining an integration time for each quad phase angle for generating the measurement signals, and wherein the integration time for at least one quad phase angle is different than the integration time for at least one other quad phase angle.

9. The method of claim 7, further comprising generating a second modulated light signal with a different modulation frequency than for the first modulated frequency, and wherein selecting the first set of quad phase angles comprises selecting a set of quad phase angles for each of the modulation frequencies, and wherein calculating the distance includes using reflected light signals with both modulation frequencies.

* * * * *